United States Patent Office

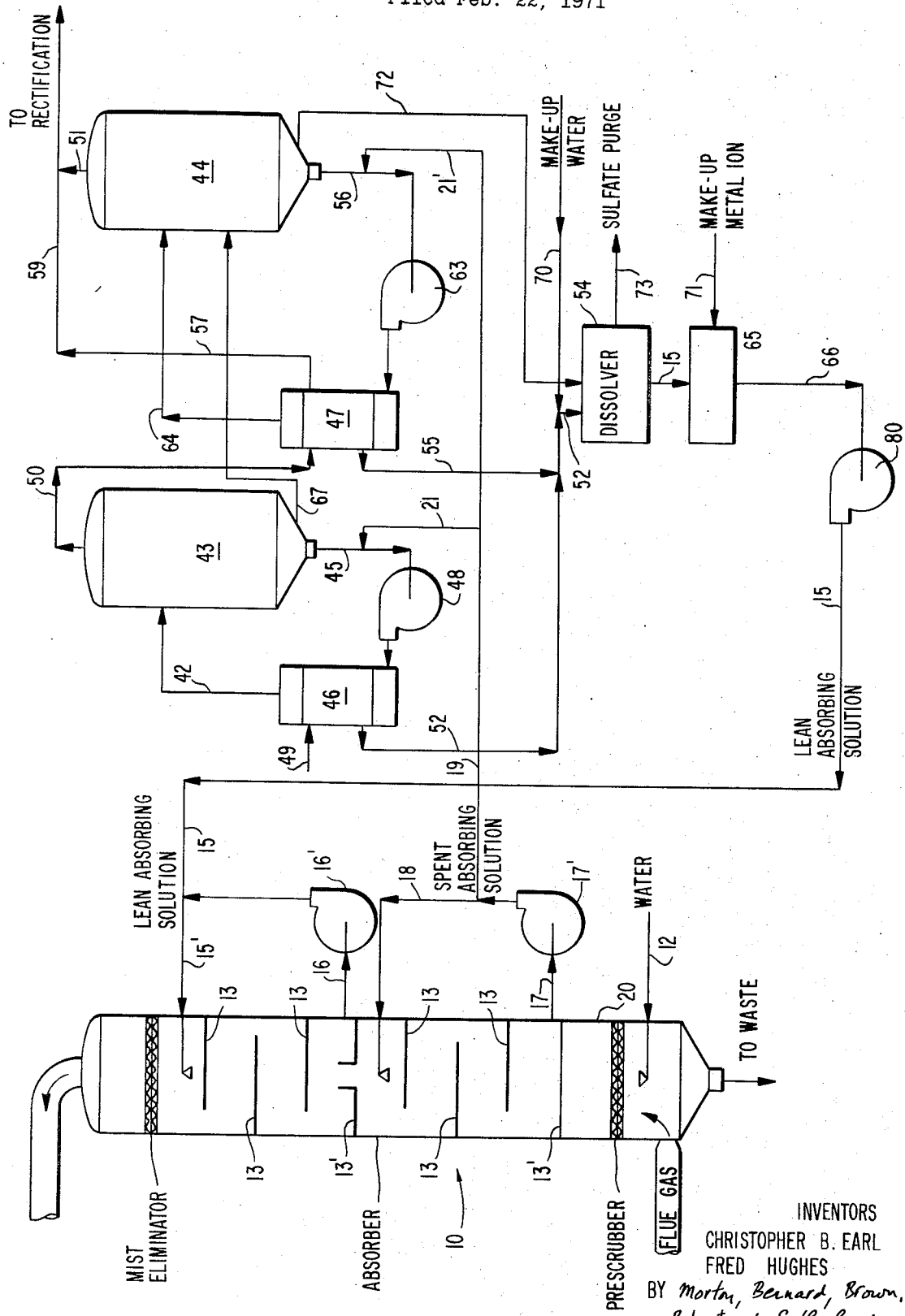

3,790,660
Patented Feb. 5, 1974

3,790,660
PROCESS FOR RECOVERING SULFUR DIOXIDE FROM GASES
Christopher B. Earl and Fred Hughes, Lakeland, Fla., assignors to Wellman-Lord, Inc., Lakeland, Fla.
Filed Feb. 22, 1971, Ser. No. 117,383
Int. Cl. C01b 17/00
U.S. Cl. 423—242
21 Claims

ABSTRACT OF THE DISCLOSURE

The disclosure is of an improvement in a sulfur dioxide removal process wherein a sulfur dioxide-containing gas is contacted with an aqueous absorbing solution of a metal sulfite, e.g., sodium sulfite, to yield a spent absorbing solution of metal bisulfite, and the latter is decomposed to produce the sulfite, sulfur dioxide and water, with water and sulfur dioxide being evaporated and sulfite being precipitated from solution. The decomposition is conducted while adding heat to the material undergoing decomposition by the use of indirect heat exchange between the material which is passed through the tubes of the heat exchanger, and a heat-supplying medium in contact with the exterior surfaces of the tubes. The operation is particularly characterized by the presence of at least about 25 weight percent undissolved solids in the material undergoing decomposition, preferably about 30 to 50 weight percent. A portion of the material undergoing decomposition and containing sulfite can be recycled to the absorption step to serve as a source of aqueous absorbing solution. Preferably, this recycle stream is formed by adding water to a portion of the material undergoing decomposition without separation of significant amounts of undissolved solids.

---

This invention relates to a process of removing sulfur dioxide from a gas containing same, e.g. from a waste gas such as a flue gas, by contacting the gas with an aqueous absorbing solution of sodium, lithium or beryllium sulfite to produce a spent absorbing solution of the corresponding bisulfite. More particularly, the invention relates to an improvement in the process wherein spent absorbing solution is desorbed or decomposed to release sulfur dioxide which has been removed from the gas mixture, and to regenerate sulfite for reuse in the absorption and wherein heat is supplied to the material undergoing decomposition by indirect heat exchange.

It is known that sulfur dioxide can be removed and recovered from a sulfur dioxide-containing gas by a process which includes contacting the gas in an absorption zone with a lean, aqueous absorbing solution of sodium, lithium or beryllium sulfite so as to absorb sulfur dioxide from the gas and yield a spent absorbing solution of the corresponding metal bisulfite. The latter solution is subjected in a desorption or decomposition zone to conditions of temperature, pressure and residence time sufficent to decompose bisulfite to sulfite, sulfur dioxide and water. During the decomposition, sulfur dioxide and water are evaporated from the solution and the corresponding metal sulfite is precipitated from the solution to form a slurry. Precipitation of the metal sulfite serves to increase the sulfur dioxide partial pressure of the solution and facilitates the decomposition reaction by reducing the heat requirements. The sulfite present in the material undergoing decomposition can serve as a source of the sulfite solution charged to the absorption zone.

A very desirable manner of conducting the decomposition or desorption of the bisulfite solution is by supplying heat to the material undergoing decomposition by way of indirect heat exchange. In the heat exchanger the material undergoing decomposiiton, which is generally composed primarily of the metal sulfite, bisulfite and sulfate and water, is inside the heat exchange tubes while a heat-supplying medium is in heat-exchange contact with the exterior surfaces of the tubes. In a quite suitable system there is provided in the decomposition zone, one or more vessels for separating the evolved sulfur dioxide and water from the slurry and the slurry undergoing decomposition is withdrawn from the vessel, passed through the heat exchanger and returned to a vessel in which the separation of sulfur dioxide and water is accomplished. In a commercial adaption of this system it was considered quite appropriate to conduct the decomposition-separtaion operation while controlling the undissolved solids or crystal content of the slurry at about 10 to 15 weight percent, i.e. the slurry contained about 10 to 15 weight percent of total crystals (primarily metal sulfite and sulfate with none or a minor amount of the crystals being metal bisulfite) based on the total weight of the crystals and aqueous solution. To operate with a slurry of higher crystal content was considered inadvisable since the slurry could be difficult to handle; cause undue wear in pumps, heat exchanger tubes, and other handling equipment; require more energy to transport; and lead to deposition of undesirable amounts of crystals on the inside of the heat exchanger tubes thereby giving rise to inefficient heat transfer from the heat-supplying medium to the slurry and reduced flow through the tubes. When this system was installed it was found that contrary to expectations, the efficiency of the heat exchange was materially reduced due to the amount of crystals deposited on the inside of the tubes. This difficulty led in turn to shorter operating periods using a given heat exchanger and more frequent shut-down of the equipment for cleaning. As a result, the cost of running the process was materially increased.

It has now been found that the foregoing described difficulties in operation of the process are materially reduced and may even be essentially entirely avoided, by conducting the bisulfite decomposition with a slurry having at least about 25 percent total metal sulfite, sulfate and bisulfite crystals, based on the total weight of the crystals, dissolved metal sulfite, sulfate and bisulfite and water. In a typical operation the designated crystal content is in essence the weight of the crystals based on the total weight of the slurry. The amount of crystals can be increased as long as the slurry remains sufficiently fluid to be readily handled, say up to about 60 or more weight percent of the slurry. Preferably, the amount of crystals is at least about 30 weight percent and will often not significantly exceed about 50 weight percent. As a result of the use of the slurry of increased crystal content not only are heat exchanger difficulties avoided but the process performs well in terms of slurry handling characteristics, energy requirements, and wear on equipment. Also, due to the increased crystal content of the slurry, less separation equipment, e.g. centrifuge, capacity is required in those cases were it is desired to separate crystals from the liquid or mother liquor portion of the slurry, and the use of less expensive liquid-solid separation techniques such as filtration or decantation may even be permitted. Also, the crystals present in the slurry decomposed in the process of this invention are sufficiently large in size to facilitate centrifuging or other types of liquid-solid separation procedures.

It has also been found in accordance with this invention that the use of the high crystal content slurry can permit direct recycling to the absorption step of the process, that is, the slurry can be used as a source of absorbing liquid without the necessity for separating crystals from the mother liquor of the slurry. In prior operations it had been considered advisable to separate crystals from the typical lower crystal content slurry, and then recycle the crystals to the absorption zone of the process as a metal sulfite-containing aqueous solution resulting from dissolution of the crystals in water or other aqueous medium. The mother liquor from the separation could be recycled to the desorption or decomposition zone. The high crystal content slurry operation of the present invention permits the recycle of the total slurry components to the absorption zone without necessitating any significant separation of crystals, thereby avoiding a considerable expense and source of operating difficulty, especially in the case of centrifuging. Also, if crystals are not to be separated from the mother liquor, shorter residence time in the desorber may be employed since time for crystal growth is of less significance, and as a result, the operator may be able to use a smaller desorption vessel. Thus, in this invention, a representative portion of the slurry can be withdrawn from the decomposition zone, water or other aqueous material added to dissolve the crystals, and the resulting solution sent to the absorption zone. Even if there is a desire to separate crystals from the decomposition slurry, this operation is facilitated according to the present invention since the crystal content of the slurry is greater than in prior decomposition operations using the general sulfite absorption-bisulfite desorption system.

The improved process of the present invention is particularly useful for removing sulfur dioxide from waste gases containing the same, e.g. from smelter gases, off-gases from chemical plants, or stack gases from coal or oil burning furnaces, when the concentration of sulfur dioxide is generally from about 0.05 to about 10 mole percent, and frequently up to about 0.5 mole percent. However, the process is not limited to such applications. Rather, the invention can be employed wherever the objective is to remove sulfur dioxide from gases containing the same, be they waste gases or otherwise, and be the sulfur dioxide present therein in large or small concentration.

The contacting of the sulfur dioxide-containing gas with an aqueous solution of the metal sulfite is affected at temperatures and pressures which provide for the sulfur dioxide, the metal sulfite and the water to inter-react and yield the corresponding metal bisulfite (also known as the "hydrogen sulfite"). The contacting temperature should be lower, however, than the decomposition point of the desired bisulfite at the absorption pressure. With sodium sulfite as the absorbing solution, for example, the reaction in the absorption zone can be represented by the following equation:

(I) $Na_2SO_3 + SO_2 + H_2O \rightarrow 2NaHSO_3$

Generally suitable for use in the absorption zone are temperatures of at least about 90° F., preferably at least about 100° F., up to about 230° F., preferably up to about 190° F., and most preferred are temperatures in the range of about 120° to 175° F. Flow rates of the aqueous absorbing solution through the absorption zone can be adjusted according to the sulfur dioxide concentration in the gas being treated and the sulfite concentration in the solution so that the major amounts, e.g., up to about 95% or more, of the sulfur dioxide may be removed from the gas by reaction with the sulfite solution.

The fresh, or "lean," absorbing solution used in the absorption zone is an aqueous solution of the metal sulfite, preferably sodium sulfite, and contains a sufficient concentration of the sulfite to effect removal of the desired amount of sulfur dioxide from the gas being treated. The lean absorbing solution often contains about 10 to 35 weight percent of the sulfite, based on the weight of the solution, not all of the salts of which need to be actually dissolved, however. In other words, a slurry, while it may be more difficult to handle than a complete solution, can be employed as the lean absorbing solution used in the process, but generally not more than about 5 or somewhat more weight percent undissolved material is in the absorbing solution.

There will usually be present in the lean absorbing solution minor amounts of other salts of the essential metal of the absorbing solution, e.g. the metal sulfate and the metal bisulfite. For instance, the metal sulfate level may be up to about 10 weight percent, preferably less than about 5 weight percent, and the metal bisulfite level may be up to about 15, preferably up to about 10, weight percent, all based on the total weight of the solution. The presence of these other salts can be occasioned by the cyclic nature of the process, as will be apparent from the more detailed discussion hereinafter. The metal sulfate, e.g. sodium sulfate, can result from the occurrence of various side reactions involving the metal sulfite, the sulfur dioxide, and any sulfur trioxide or oxygen which may be present in the gas being treated. The propensity for sulfate-forming reaction generally increases as the temperature increases. In order to retard such sulfate production a minor, effective amount, e.g. about 0.01 to 0.3 weight percent, of an oxidation inhibitor can be present in both the lean and spent absorbing solutions.

Generally, the total metal sulfite, sulfate and bisulfite salt content of the lean absorbing solution will be about 15 to 50, preferably about 20 to 40, weight percent, based on the total weight of the solution. Generally, at least about 50 weight percent of these salts, preferably at least about 60 weight percent, can be comprised of the metal sulfite. The contacting of the sulfur dioxide-containing gas with the lean absorbing solution can be effected by allowing the solution to descend by gravity through a reaction or absorption zone while passing the gas upwardly through the descending solutions. Thus, the absorption zone can advantageously be a countercurrent liquid-gas contacting tower whose design and construction can be according to specifications known in the art.

The spent absorbing solution removed from the absorption zone may often contain about 10 to 50, preferably about 15 to 35, weight percent of metal bisulfite; up to about 20, often about 3 to 10, weight percent of the metal sulfite; and up to about 15, often less than about 8, weight percent of the metal sulfate, all based on the total weight of the solution or spent absorption zone effluent. Again, while handling problems and equipment requirements can be diminished when the spent absorbing solution is a complete solution, it is, nevertheless, also contemplated that a portion of the salt content can be undissolved and, consequently, that the spent absorbing solution can be removed from the absorption zone in the form of a slurry, or can be removed as a complete solution but be converted to a slurry prior to being introduced to the desorption zone. In the event the solution is to be pumped from an absorption zone to a desorption zone, the principal requirement in this regard is that the solution, whether it be a complete solution or a slurry, be pumpable so that it can be removed from the absorption zone and conducted to the desorption zone.

In the process of the present invention substantially all of the bisulfite content of both the lean and the spent absorbing solutions will generally be dissolved, as opposed to being in suspension in the dehydrated form, i.e. as the pyrosulfite. This is because the sulfites of sodium, lithium and beryllium are less water-soluble than their bisulfite counterparts and will, therefore, precipitate out of solution first. The recitations herein and in the claims, however, of bisulfite content (either in terms of solution concentrations or expressed as bisulfite-to-sulfite ratio, or whatever) are intended to embrace any pyrosulfite which may be present as well.

Temperatures in the desorption zone are maintained sufficiently high to provide for the decomposition of the metal bisulfite back to the sulfite, sulfur dioxide, and water. In the sodium system, for example, the reaction can be represented by the following equation:

(II) $2NaHSO_3 \xrightarrow{\Delta H} Na_2SO_3 + SO_2 + H_2O$

Also, the combined conditions of temperature, pressure, and residence time in the desorption zone generally provide for the separation of sulfur dioxide and water from the material undergoing decomposition. An essential part of the present invention is the operation of the desorption or decomposition under conditions which provide a slurry of at least about 25 weight percent crystals as aforesaid. A convenient manner of establishing the desired crystal content in the slurry undergoing decomposition is to start the process and continue charging spent absorbing solution to the decomposition zone without withdrawing any portion of the slurry undergoing decomposition, except, for instance, cycling the slurry through the heat exchanger for supplying heat needed to decompose the bisulfite of the spent absorbing solution. Thus, no slurry would be withdrawn from the decomposition zone to serve as a source of lean absorption solution until the desired crystal content in the slurry is reached. In one alternative procedure, some slurry can be so withdrawn and returned as an aqueous solution to the absorption zone, and in order to increase the crystal content of the slurry undergoing decomposition, the amount of metal, e.g. sodium, in the lean absorption medium, in addition to any of the metal being internally recycled in the absorption zone, is maintained greater than the total withdrawn from the slurry undergoing decomposition. Once the slurry undergoing decomposition has the desired crystal content then an essentially stable operation can be established by adding sufficient of the metal to the system, e.g. as a base such as sodium hydroxide, to make up for metal losses from the system as may occur due, for example, to mechanical losses or purging or removing the metal from the system as the sulfate.

Generally suitable temperatures for effecting the desorption or decomposition of the slurry of this invention are in the range of about 150 to 350° F. or more. It is often preferred to employ temperatures of at least about 200° F., or even at least about 215° F., and up to about 300° F., or even only up to about 290° F. Sulfate production, even with the presence of an oxidation inhibitor, may become troublesome at temperatures above about 300° F. Also, corrosion of stainless steel equipment may become a problem at the higher temperatures. The pressure employed is sufficiently low to permit vaporization of water and sulfur dioxide at the desorption zone temperature. While subatmospheric pressures can be employed, and may even be advisable or necessary to effect the desired decomposition at the lower temperatures, e.g., say below about 200° F., it is preferred to operate at atmospheric pressure and above, say up to about 100 p.s.i.a. (pounds per square inch absolute). The residence time under these conditions of temperature and pressure is usually sufficient to permit water and sulfur dioxide to separate from the solution as a gaseous mixture which can be removed from the desorption zone, and to allow for the formation of the metal sulfite crystals in the material undergoing decomposition. Often suitable will be residence times of about one-half to 4 hours, preferably, say, about 1 to 3 hours.

During decomposition of the spent absorbing solution, metal bisulfite is generally decomposed to the corresponding metal sulfite, sulfur dioxide and water, and preferably at least about 40 weight percent or at least about 50 weight percent of the bisulfite is so decomposed. The slurry undergoing decomposition may contain, for example, about 60 to 80, preferably about 65 to 75, total weight percent of the total metal salts, i.e. sulfite, bisulfite and sulfate, based on the total weight of the slurry. In such case, crystals of the slurry may be composed on a dry basis of about 60 to 80, preferably about 70 to 80, weight percent metal sulfite; up to about 2, preferably up to about 1, weight percent metal bisulfite, and up to about 40, preferably up to about 30, weight percent metal sulfate. The liquid phase or mother liquor of the slurry may, for example, contain about 3 to 8, preferably about 4 to 5, weight percent metal sulfite; about 30 to 40, preferably about 35 to 40, weight percent metal bisulfite, and up to about 6, preferably up to about 5, weight percent metal sulfate, and the substantial balance of the mother liquor is water. The mother liquor or solution undergoing decomposition, as distinguished from the crystals present, usually contains at least about 65 weight percent of metal bisulfite on a dry basis and preferably at least about 80 weight percent of metal bisulfite based on the weight of metal bisulfite plus metal sulfite. All of these percentages are given at the temperature prevailing in the decomposition zone.

As previously noted, in the present invention heat is supplied to the metal bisulfite decomposition zone by passing the slurry undergoing decomposition through the tubes of an indirect heat exchanger. In this type of operation it is preferred to maintain the desired slurry temperature by sending relatively large amounts of slurry through the heat exchanger while increasing by only a few degrees the temperature of the slurry as it passes through the exchanger. For example, the rise in the temperature of the slurry between the inlet and outlet of the heat exchanger can be below about 10° F. and preferably does not exceed 5° F. or even not more than 3° F. In order to supply sufficient heat to the decomposition under such conditions the slurry undergoing desorption or decomposition is advantageously passed through the heat exchanger tubes at a rate of at least about one time per minute based on the total weight or inventory of slurry in the decomposition zone, preferably at least about 1.2 times per minute. Depending on the internal diameter of the heat exchanger tubes, the superficial velocity of the slurry passing through the tubes is often at least about 10 feet per second, preferably at least about 12 feet per second. It is also preferred that the temperature difference across the walls of the tubes, i.e. between the slurry in the tubes and the heat exchange medium contacting their external surfaces, be less than about 25° F., preferably less than about 20° F.

In a typical evaporator-heat exchanger combination which can be employed in one form of the present invention, the slurry forms a more or less continuous body of crystal-bearing liquid that is circulated between the evaporator and heat exchanger. Usually these vessels are in a general side-by-side relationship with a pump being used to maintain the desired slurry flow. The body of slurry in the evaporator can have a liquid level above the heat exchanger sufficient to exert a pressure head on the latter so that as the slurry from the heat exchanger is introduced into the evaporator, sulfur dioxide and water vapors are flashed from the slurry and evolved and separated from the evaporator as overhead.

Although only a single evaporator-heat exchanger combination can be employed in the metal bisulfite decomposition zone of this invention, it is preferred that the desorption zone be made up of a plurality of distinct desorbing or evaporator vessels (preferably 2 or 3), each of which has its own heat exchanger as described above. Preferably, each desorbing vessel is maintained at a different pressure, and the spent absorbing solution is conducted to the vessels in parallel feed relationship. In accordance with this preferred embodiment of the invention the vessels are staged in multi-effect relationship wherein the overhead vapors from all but the lowest pressure vessel are brought into indirect heat exchange contact with the solution being desorbed in the next lowest pressure vessel. By the use of this parallel feed of spent absorbing solution and multi-effect staging of the desorbing vessels, the overall desorption is effected more efficiently, in terms of energy expended. Also, in a preferred embodiment the slurry of an upstream desorbing vessel circuit can be fed to a downstream or lower pressure desorbing vessel circuit to obtain a flashing effect, and the slurry used as a source of lean absorbent for recycle to the absorption zone is withdrawn from the last-in-line desorption slurry circuit as shown in the system of the accompanying drawing. This type of flow system further enhances the efficiency of the desorption operation.

Although the metal sulfite which is present as a precipitate in the desorption zone slurry can be separated from its mother liquor by any suitable technique, it is strongly preferred that the slurry withdrawn from the desorption zone be dissolved in water or other aqueous liquid and recycled as lean absorbing solution to the absorption zone. Generally, enough of the aqueous liquid is added to dissolve most, if not essentially all, of the crystals of the withdrawn slurry, and any significant excess of aqueous liquid added merely serves to increase the heat requirements of the system in order to remove such water in the desorption zone. A suitable source for the aqueous liquid is water that is evaporated in the desorption zone. Thus, the overhead mixture of sulfur dioxide and water that issues from the desorption zone can be recovered and the water content separated and used to form lean absorbing solution. The $SO_2$ in the vaporous effluent from the desorption zone is, of course, of commercial value, and, if desired, it can be rectified to obtain a purer product.

The present invention will be further described by considering the accompanying drawing which is a schematic flow sheet of a process system employing the present invention in the removal and recovery of sulfur dioxide from a flue gas. Equipment such as valves, pumps, heat exchangers, surge tanks, and the like, which would be used in a commercial embodiment of the invention, is not shown since it can be of conventional design and employed in accordance with practices well known in the art.

Referring to the drawing, sulfur dioxide-containing flue gas, e.g. from a coal-burning furnace, enters absorber vessel 10 near the bottom thereof at a temperature, for example, of about 340° F. The flue gas, which typically contains about 0.25 mole percent of sulfur dioxide, 0.005 mole percent sulfur trioxide, 11.4 mole percent carbon dioxide, 3.2 mole percent oxygen, 73.4 mole percent nitrogen and 11.7 mole percent water, along with about 0.003 weight percent fly ash, passes upwardly through a prescrubber zone 20 in vessel 10. Water or other aqueous liquid is passed co-currently with the flue gas to a bed of column packing 11, the water or other liquid being supplied through line 12. This pre-scrubbing with an aqueous liquid serves to remove suspended solids such as fly ash and relatively highly water-soluble components, e.g. sulfur trioxide, from the flue gas. All of the fly ash may not be removed from the gas by prescrubbing and may appear in minor amounts in the various streams of the process; however, the process is hereinafter described on a fly ash-free basis.

The prescrubbed flue gas next enters a main absorption zone in absorber 10 wherein it passes upwardly, through sieve trays 13 and, through a descending flow of lean absorbing solution, the latter being supplied to vessel 10 through lines 15 and 15'. Absorber 10 may employ other types of liquid gas contacting structures, such as a packed tower, bubble cap column, alternate ring and discs or the like. In a typical example using sodium sulfite, the lean absorbing solution in line 15 is at a temperature of about 140° F., contains about 18.8 weight percent sodium sulfite, about 4.1 weight percent sodium bisulfite (calculated as the pyrosulfite, $Na_2S_2O_5$), about 4.8 weight percent sodium sulfate, and the balance being essentially water. Substantially cleansed of sulfur dioxide, the flue gas next passes through a mist elimintor, which, for example, is a layer of woven wire mesh wetted with sprays of water and then the flue gas exits the top of the absorber 10 at, for example, a temperature of about 140° F. and contains less than 0.05 mole percent sulfur dioxide.

To provide for better absorption of the sulfur dioxide, the absorbing solution is collected on gas-passing trays 13' located in the middle and at the bottom of the absorbing section of absorber 10 and recycled to the column. Thus, the liquid on upper tray 13' is recycled to the upper part of the absorbed by way of line 16, pump 16' and line 15', while liquid from the lower tray 13' is recycled to the column at a point just below upper tray 13' via line 17, pump 17' and line 18. The spent absorbing solution contains 5.8 weight percent sodium sulfite, 21.2 weight percent sodium bisulfite (calculated as the pyrosulfite), 5 weight percent sodium sulfate and the essential balance being water.

Spent absorbing solution is removed from line 18 through line 19, heated (hater not shown) to 200° F., and introduced through lines 21 and 21' into the recycle circuits of the respective desorbers 43 and 44. The conditions of temperature, pressure, and residence time in desorbers 43 and 44 are so maintained as to effect the desired decomposition, evaporation, and precipitation to form a slurry of desired undissolved solids content. Lines 21 and 21' convey about equal amounts of the spent absorbing solution, e.g. about 53 and 47%, respectively, to their respective desorbing vessels 43 and 44.

Desorbing vessels 43 and 44 are arranged in a multiple-stage effect relationship. Desorbing vessel 43 is operated at the higher temperature and pressure (i.e., about 267° F. and 34.1 p.s.i.a.), and vessel 44 at a lower temperature and pressure (e.g. about 224° F. and 14.7 p.s.i.a.). A recycle stream of slurry is heated in connection with each of the vessels 43 and 44, the heating being done in calandrias 46 and 47, respectively. In order to effect heating in vessel 43, the liquid-undissolved solids mixture or slurry in the vessel is withdrawn from the vessel by line 45, combined with feed from line 21, sent through pump 48, through the metallic tubes of calandria 46 and back to vessel 43 by way of line 42. Similarly, the slurry in vessel 44 is withdrawn by line 56 and after being combined with spent absorbing solution from line 21', is sent by pump 63 through the metallic tubes of calandria 47 and line 64 back to desorbing vessel 44. Thus, the slurry from vessel 43 is heated from 267° F. to 270° F. in calandria 46 and the slurry from vessel 44 is heated from 224° F. to 227° F. in calandria 47. Each of the slurries contains about 40% of undissolved solids. The volume ratio of the slurry withdrawn from vessel 43 in line 45 to the spent absorbing solution introduced into line 45 from line 21 is about 320:1, and the volume ratio of the slurry withdrawn from vessel 44 in line 56 to the volume of spent absorbing solution introduced into line 56 from line 21' is about 320:1. The turn-over rate for heat exchanger 46, i.e. the weights of slurry passed through the heat exchanger per weight of total slurry resident in the desorbing vessel 43 and its heat exchanger recycle circuit, is 1.25 per minute, while the turn-over rate for heat exchanger 47 is 1.25 per minute.

Steam, at about 298° F. and 65 p.s.i.a., is introduced to calandria 46 through line 49 as the prime energy source for the desorption zone. Calandria 47, meanwhile, is heated by the sulfur dioxide and water-containing overhead vapors in line 50 coming from desorbing vessel 43 at a temperature of 267° F. The condensate (water) from calandria 46, having a temperature of 279° F., is sent through lines 52 to dissolving tank 54. In calandria 47 the indirect heat exchange contacting effects condensation of a portion of the steam, but not the sulfur dioxide, in the overhead gases from desorbing vessel 43. The steam condensate having a temperature of 263° F. is sent through lines 55 and 52 to dissolving vessel 54, while the uncondensed vapors which are at 236° F. are carried through line 57 to line 59. Line 57 typically carries vapor containing about 60 weight percent sulfur dioxide and the balance being essentially water vapor. The overhead vapors from desorbing vessel 44 are removed from the vessel by line 51 and are combined in line 59 with the aforementioned vapors leaving calandria 47. The vapor in line 51 typically contains about 7.2 weight percent sulfur dioxide and the balance being essentially water vapor. The combined vapors in line 59 can be sent to a rectification system (not shown) for recovering sulfur dioxide.

Slurry is passed from desorber 43 to desorber 44 by way of line 67. This slurry is at a temperature of 267° F. and has a composition of approximately 34 weight percent sodium sulfite, about 12 weight percent sodium sulfate, about 21 weight percent sodium bisulfite (calculated as pyrosulfite), and the balance being essentially water.

Slurry containing about 40 weight percent of undissolved solids is withdrawn from vessel 44 by way of line 72 and passed to dissolver tank 54. This slurry is at a temperature of 224° F. and has about 34 weight percent sodium sulfite, about 21 weight percent sodium bisulfite (calculated as pyrosulfite), about 12 weight percent sodium sulfate and an essential balance of water. The undissolved solids from line 72 are dissolved in tank 54 in water, including, for instance, the water of condensation that is obtained from calandrias 46 and 47. Make-up water, for example from rectification (not shown), is supplied to tank 54 through line 70, and a sulfate purge stream is wtihdrawn by line 73. The purge solution has about 14.1 weight percent sodium sulfite, about 8.6 weight percent sodium bisulfite (calculated as pyrosulfite), about 5 weight percent sodium sulfate and an essential balance of water. Make-up sodium ion, for example as an aqueous sodium hydroxide solution, is added to feed tank 65 through line 71. The lean absorbing solution prepared in tank 65 is withdrawn through line 66 and is sent by pump 80 through line 15 to the absorption zone 10 of the process.

EXAMPLES II AND III

Essentially the same procedure used in Example I is followed, except that lithium sulfite is used instead of sodium sulfite for Example II and beryllium sulfite is used instead of sodium sulfite for Example III, and the same general result is obtained.

It is claimed:

1. A method of removing sulfur dioxide from a gas containing the same comprising contacting said gas in an absorption zone with a lean, aqueous absorbing solution of a metal sulfite selected from the group consisting of sodium, lithium and beryllium sulfites to absorb sulfur dioxide in said gas by converting sulfite to bisulfite and yielding a spent absorbing solution containing the corresponding metal bisulfite; subjecting spent absorbing solution in a desorption zone to elevated temperatures sufficient to decompose bisulfite to sulfite, sulfur dioxide and water, to remove sulfur dioxide and water from the solution and to precipitate sulfite from the solution while maintaining in said desorption zone precipitated sulfite-containing slurry having a total of at least about 25 weight percent of crystals in the form of sulfite, bisulfite and sulfate of said metal based on the total weight of said crystals, dissolved sulfite, bisulfite and sulfate of said metal and water in said slurry; passing slurry undergoing decomposition in said desorption zone through the tubes of an indirect heat exchanger while supplying heat to said slurry for said decomposition; and recycling sulfite of said slurry to the absorption zone.

2. The method of claim 1 wherein the metal sulfite is sodium sulfite.

3. The method of claim 1 wherein the slurry passing through the heat exchanger tubes has about 30 to 50 weight percent of said crystals.

4. The method of claim 1 wherein sulfite-containing slurry from said desorption zone and without separation of said crystals from the slurry is combined with an aqueous medium to dissolve said crystals before recycle to said absorption zone.

5. The method of claim 4 wherein the metal sulfite is sodium sulfite.

6. The method of claim 5 wherein the slurry passing through the heat exchanger tubes has about 30 to 50 weight percent of said crystals.

7. The improvement of claim 6 wherein the lean, aqueous absorbing solution of sodium sulfite contains about 10 to 35 weight percent of sodium sulfite and up to about 15 weight percent of sodium bisulfite, with the proviso that the total sodium sulfite, bisulfite and sulfate salt content of the solution is in the range of about 15 to 50 weight percent and the sodium sulfite constitutes at least about 50 weight percent of the total sodium salt content.

8. The improvement of claim 7 wherein the spent absorbing solution contains about 10 to 50 weight percent of sodium bisulfite and up to about 20 weight percent of sodium sulfite.

9. The method of claim 8 wherein the sulfur dioxide-containing gas, prior to being contacted in said absorption zone, is contacted with an aqueous liquid to remove from the gas sulfur trioxide and suspended solids when present in said gas.

10. A method of removing sulfur dioxide from a gas containing same comprising contacting said gas in an absorption zone with a lean, aqueous absorbing solution of sodium sulfite to absorb sulfur dioxide in said gas by converting sulfite to bisulfite and yielding a spent absorbing solution of sodium bisulfite, said contacting being at a temperature of about 100 to 190° F., said lean absorbing solution is in the range of about 15 to 50 weight percent dium sulfite, up to about 15 weight percent of sodium bisulfite, and up to about 10 weight percent of sodium sulfate, with the proviso that the total of these salts in the solution is in ther ange of about 15 to 50 weight percent and the sodium sulfite constitutes at least about 50 weight percent of the total sodium salt content; subjecting spent absorbing solution in a desorption zone to a temperature of about 200° F. to 290° F. to decompose sodium bisulfite to sodium sulfite, sulfur dioxide and water, to remove sulfur dioxide and water from the solution and to precipitate sodium sulfite from the solution while maintaining in said desorption zone precipitated sulfite-containing slurry having a total of at least about 30 weight percent of crystals in the form of sulfite, bisulfite and sulfate of said metal based on the total weight of said crystals, dissolved sulfite, bisulfite and sulfate of said metal and water in said slurry; passing said slurry from said desorption zone through the tubes of an indirect heat exchanger while supplying heat to said slurry for said decomposition; returning said heated slurry to said desorption zone; adding an aqueous medium to slurry removed from said decomposition zone to dissolve said crystals therein without separation of crystals from said slurry; and recycling resulting sulfite solution to said absorption zone.

11. The method of claim 10 wherein the spent absorbing solution contains about 15 to 35 weight percent of sodium bisulfite and about 3 to 10 weight percent of sodium sulfite.

12. The method of claim 11 wherein the sulfur dioxide-containing gas, prior to being contacted in said absorption zone, contains about 0.05 to 0.5 mole percent of sulfur dioxide.

13. The method of claim 12 wherein the temperature increase in the slurry during passage through said heat exchange is up to 5° F.

14. The method of claim 13 wherein the temperature differential across the walls of the tubes of said heat exchanger is up to about 20° F.

15. The method of claim 14 wherein the total weight of slurry undergoing desorption is passed through the indirect heat exchange at least about one time per minute.

16. The method of claim 1 wherein the temperature increase in the slurry during passage through said heat exchange is up to 5° F.

17. The method of claim 16 wherein the temperature differential across the walls of the tubes of said heat exchanger is up to about 20° F.

18. The method of claim 1 wherein the total weight of slurry undergoing desorption is passed through the indirect heat exchange at least about one time per minute.

19. The method of claim 18 wherein the temperature increase in the slurry during passage through said heat exchange is up to 5° F.

20. The method of claim 19 wherein the temperature differential across the walls of the tubes of said heat exchanger is up to about 20° F.

21. The method of claim 20 wherein the metal sulfite is sodium sulfite.

References Cited

UNITED STATES PATENTS

| 3,607,037 | 9/1971 | Terrana et al. | 23—178 R |
|---|---|---|---|
| 3,627,464 | 12/1971 | Terrana et al. | 23—178 R |
| 3,653,812 | 4/1972 | Scheider et al. | 423—242 |

EDWARD J. MEROS, Primary Examiner

G. A. HELLER, Assistant Examiner

U.S. Cl. X.R.

423—244

UNITED STATES PATENT OFFICE
CERTIFICATE OF CORRECTION

Patent No. 3,790,660          Dated February 5, 1974

Inventor(s) C.B. Earl et al.

It is certified that error appears in the above-identified patent and that said Letters Patent are hereby corrected as shown below:

In column 10, line 28, delete "is in the range of about 15 to 50 weight percent" and insert therefor --containing about 10 to 35 weight percent of so- --.

In column 10, line 32, change "ther ange" to read --the range--.

Signed and sealed this 22nd day of October 1974.

(SEAL)
Attest:

McCOY M. GIBSON JR.                C. MARSHALL DANN
Attesting Officer                  Commissioner of Patents